(12) United States Patent
Wallmeier et al.

(10) Patent No.: US 8,441,146 B2
(45) Date of Patent: May 14, 2013

(54) POWER SUPPLY ARRANGEMENT WITH A FIRST VOLTAGE SUPPLY DEVICE AND A SECOND VOLTAGE SUPPLY DEVICE

(75) Inventors: Peter Wallmeier, Lippstadt (DE); Christian Ferber, Mohnesee (DE)

(73) Assignee: AEG Power Solutions B.V., Zwanenburg (NL)

( * ) Notice: Subject to any disclaimer, the term of this patent is extended or adjusted under 35 U.S.C. 154(b) by 407 days.

(21) Appl. No.: 12/822,280

(22) Filed: Jun. 24, 2010

(65) Prior Publication Data

US 2011/0273013 A1 Nov. 10, 2011

(30) Foreign Application Priority Data

May 21, 2010 (EP) .................................... 10163555

(51) Int. Cl.
*H02J 1/10* (2006.01)
*H02J 3/00* (2006.01)
*H02J 3/14* (2006.01)
*H02M 1/10* (2006.01)

(52) U.S. Cl.
USPC .......................................................... 307/29

(58) Field of Classification Search .................... 307/17, 307/18, 29, 31, 34, 36
See application file for complete search history.

(56) References Cited

U.S. PATENT DOCUMENTS

| | | | |
|---|---|---|---|
| 4,562,338 A * | 12/1985 | Okami | 219/503 |
| 6,067,482 A | 5/2000 | Shapiro | |
| 6,583,521 B1 | 6/2003 | Lagod et al. | |
| 7,279,811 B2 | 10/2007 | Vollmar et al. | |
| 2006/0071554 A1 | 4/2006 | McNamara et al. | |
| 2008/0179952 A1 | 7/2008 | Vollmar et al. | |

FOREIGN PATENT DOCUMENTS

| | | |
|---|---|---|
| DE | 20318061 U1 | 2/2004 |
| DE | 202004004655 U1 | 5/2004 |
| DE | 202004014812 U1 | 11/2004 |
| DE | 20 2009 003 325 U1 | 6/2009 |
| DE | 10 2009 021 403 A1 | 1/2010 |
| DE | 102009021403 A1 | 1/2010 |
| DE | 2007 001 083 U1 | 6/2010 |
| WO | 2009/153657 A1 | 12/2009 |

OTHER PUBLICATIONS

U.S. Appl. No. 12/781,088, filed May 17, 2010, Wallmeier, et al.
G.K. Dubey, et al.; Department of Electrical Engineering, Indian Institute of Technology; New Age International Limited, Publisher; pp. 248-256; 1986.
European Search Report dated Dec. 22, 2010.

* cited by examiner

*Primary Examiner* — Carlos Amaya
(74) *Attorney, Agent, or Firm* — Norris McLaughlin & Marcus, P.A.; Christa Hildebrand

(57) ABSTRACT

A current supply arrangement for, e.g., producing polysilicon, with a first current supply device and a second power supply device, including two AC current regulators and a voltage sequence controller for controlling the AC current regulators, with a terminal group having two terminals for connecting a load. A terminals is connected directly, i.e., without an interconnected switch, with an output terminal of the second current supply device, and with a first switching group associated with the terminal group, with switches for connecting and disconnecting the terminals of the terminal group with or from output terminals of the first current supply device. The current supply arrangement also includes an additional current supply device having two AC current regulators and a voltage sequence controller for controlling the AC current regulators, additional terminal groups comprising two terminals for connecting one load.

15 Claims, 1 Drawing Sheet

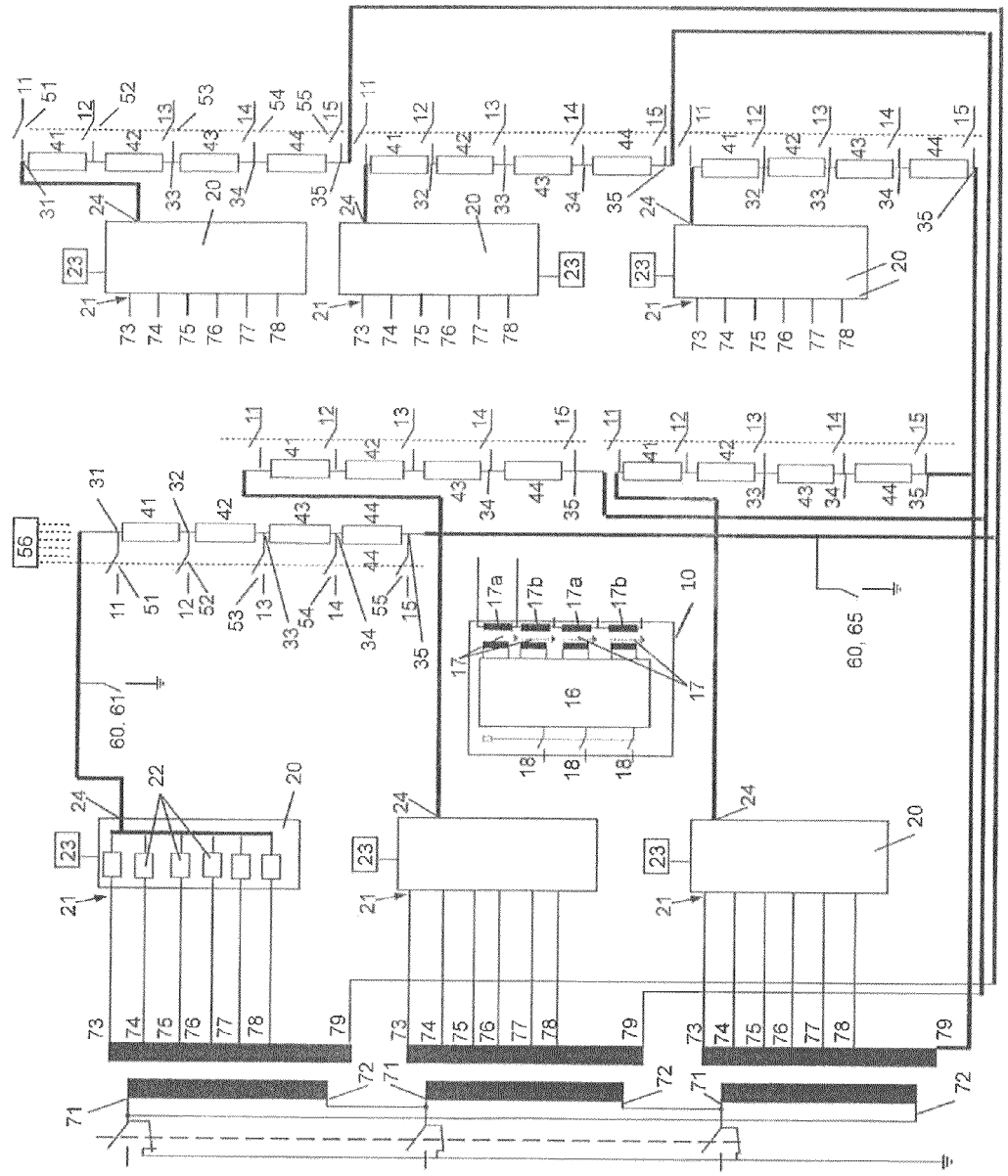

POWER SUPPLY ARRANGEMENT WITH A FIRST VOLTAGE SUPPLY DEVICE AND A SECOND VOLTAGE SUPPLY DEVICE

This application claims priority to EP 163 555.5 filed on Mar. 21, 2010.

BACKGROUND OF THE INVENTION (1) Field of the Invention

The invention relates to a current supply arrangement, in particular a current supply arrangement for a reactor for producing polysilicon with the Siemens process, with a first current supply device,
with a second current supply device comprising
at least two AC current regulators and a
voltage sequence controller for controlling the AC current regulators,
  with a terminal group comprising at least two terminals for connecting at least one load, of which terminals a first terminal is connected directly, i.e., without an interconnected switch, with an output terminal of the second current supply device, and
  with a first switching means group associated with the terminal group and having switching means for connecting and disconnecting the terminals of the terminal group with or from output terminals of the first current supply device.

(2) Description of Related Art

A current supply arrangement of this type is disclosed in the published German patent application having the publication number DE 10 2009 021 403 A1 as well as in the utility model document DE 20 2009 003 325 U1. The current supply arrangements described in these documents are used in reactors for producing polysilicon with the Siemens process or by chemical gas deposition. The first current supply device of the described current supply arrangement provides an intermediate voltage (1 to 30 kV nominal voltage), which can be applied to the thin silicon rods at the beginning of the deposition with the Siemens process. Supply of current can then be taken over by the second current supply arrangement after ignition of the rod pairs. The second current supply device includes several input terminals and several AC current regulators. The input terminals are connected to different electrical potentials which may be provided, for example, at the secondary-side taps of a transformer. The voltages supplied by the transformer are in the low-voltage range (0 to 3 kV nominal voltage). The AC current regulators of the second current supply device are each connected, on one hand, with a respective one of the input terminals and, on the other hand, with the output terminal. The AC current regulators are implemented as thyristor regulators. However, regulators with other converter valves can also be used. The AC current regulators are controlled by a sequential voltage controller. A sequential voltage controller is described, for example, in previous applications of the applicant, and also in the book "Thyristorized Power Controllers" by G. K. Dubey, S. R. Doradla, A. Joshi and R. M. K. Sinha. The voltage supplied by the second current supply device is a low-voltage.

The aforementioned publications are directed to current supply arrangements supplying electric power to four loads, i.e., four rod pairs. Reactors for the Siemens process have recently been designed for significantly more than four rod pairs. Reactors designed for 24 rod pairs have been disclosed. A current supply arrangement for a reactor with 24 rod pairs is known, for example, from the published utility model DE 2007 001 083 U1. However, the current supply arrangement disclosed in the utility model does not have a first current supply device which supplies the rod pairs with an intermediate voltage at the beginning of the deposition process. The current supply arrangement disclosed in DE 2007 001 083 U1 has several second current supply devices supplying electric energy to the rod pairs. These rod pairs are arranged in groups and at least one second current supply device is associated with the groups. The rod pairs within the group are connected in series at the beginning of the deposition process and are later connected in parallel. Switching means are provided for switching between a series connection for supplying power to the rod pairs and a parallel connection. The current supply device disclosed in the utility model publication DE 2007 001 083 U1 is quite complex due to the required switchover between the parallel operation and the series operation of the rod pairs.

This is a starting point for the present invention.

BRIEF SUMMARY OF THE INVENTION

The present invention addresses the technical problem to further develop a current supply arrangement of the aforedescribed type, so that electric energy can be supplied to a larger number of rod pairs.

This problem is solved in that the current supply arrangement includes
  additional second current supply devices having
  at least two AC current regulators and a
  voltage sequence controller for controlling the AC current regulators,
    additional terminal groups having at least two terminals for connecting at least one load, wherein of the terminals of each terminal group a first terminal is connected directly, i.e., without an interconnected switch, with an output terminal of one of the additional second current supply devices, and
    additional first switching means groups, with each additional switching means group being associated with a corresponding one of the additional terminal groups, and with first switching means for connecting and disconnecting the terminals of the terminal group with or from the output terminals of the first current supply devices.

According to an also proposed method of the invention for supplying loads connectable to terminals of terminal groups of a current supply arrangement, in particular for loads connectable to an aforedescribed current supply arrangement, the terminals of the terminal groups are sequentially connected with the output terminals of a first current supply device by way of switching means of the switching means group associated with the terminal group, while the terminals of the remaining terminal groups are disconnected from the output terminals of the first current supply device. After the terminals of a terminal group have been connected by way of the switching means of the switching means group associated with the terminal group, these terminals are supplied with electric current from a second current supply device associated with the terminal group.

Preferably, each terminal of a terminal group can be connected by way of the switching means of the associated switching means group with exactly one of the output terminals of the first current supply device.

In a particularly advantageous embodiment of the invention, each terminal group has a second terminal. The first terminal and the second terminal of each terminal group may be connected to a reference potential by way of switching means of a second switching means group.

Each terminal group of a current supply arrangement of the invention may have a number of 2*n+1 terminals, wherein n is a natural number. Of the 2*n+1 terminals, a first subgroup of n+1 terminals, preferably including the first terminal and the second terminal, may be connected to the reference potential by way of the switching means of the second switching means group.

The first current supply device of a current supply arrangement of the invention may have a number of 2*m+1 output terminals, wherein m is a natural number. The number m and the number n may be identical. A first output terminal and a second output terminal may be connectable with the first terminals and the second terminals of the terminal groups by way of the switching means of the first switching means group. The first output terminal and the second output terminal may be at the first potential during operation of the first current supply device.

Of the 2*m+1 output terminals, a first subgroup of p+1 output terminals, including the first output terminal and the second output terminal, may be at a or at the first potential during operation of the first current supply device, wherein p is a natural number less than or equal to m. Of the 2*m+1 output terminals, a second subgroup of p output terminals may be at a second potential. The nominal voltage that can be provided at the output terminals of the second current supply devices may be at least m-times the nominal voltage of the first current supply device that can be provided between the output terminals of the first subgroup and the output terminals of the second subgroup of the first current supply device.

The current supply arrangement of the invention may include at least one transformer with a plurality of secondary-side taps. An outer tap of the secondary-side taps may be connected with the second terminal of at least one terminal group. The other secondary-side taps are preferably connected with input terminals of the second current supply devices. Advantageously, the current supply arrangement has three transformers which are connected on the primary side in a Delta configuration and are connected to different outer conductors of a three-phase power grid. Preferably, an identical number of second current supply devices are connected to the secondary side of the transformers, so that the transformers are loaded uniformly and the power grid is loaded symmetrically.

According to the invention, the first current supply device may include at least one frequency converter. In addition, the first current supply device may include at least one transformer.

An exemplary embodiment of the current supply arrangement of the invention will now be described in more detail with reference to the drawing, which shows in:

BRIEF DESCRIPTION OF THE DRAWINGS

FIG. 1 a circuit diagram of a current supply arrangement according to the invention.

DETAILED DESCRIPTION OF THE INVENTION

The current supply arrangement illustrated in FIG. 1 has a first current supply device 10. The first current supply device 10 has three input terminals 18 which are connected with outer conductors of a three-phase power grid by way of a three-pole switch. Inside the first current supply device 10, the input terminals 18 are connected via a frequency converter 16 with a first pair and a second pair of transformers 17. Each pair has a first transformer 17a and second transformers 17b. The transformers 17 have secondary coils with taps connected to output terminals 11, 12, 13, 14, 15.

A first output terminal 11 and a second output terminal 15 are connected to only one tap of a secondary coil of a transformer 17. The first output terminal 11 is connected with the first transformer 17a of the first pair and the second output terminal 15 is connected with the second transformer 17b of the second pair. A third output terminal 13 is connected with a tap of the second transformer 17b of the first pair and with a tap of the first transformer 17a of the second pair. The other output terminals 12, 14 are each connected with a corresponding tap of the first transformer 17a and with a tap of the second transformer 17b of the first and second pair, respectively. The secondary coils of a pair of transformers are wound with an opposite winding sense, so that opposing voltages are produced across the secondary coils of the two transformers 17 of a pair for the same input voltage at the primary coils of the transformers 17. The first output terminal 11, the second output terminal 15 and a second output terminal 13 are therefore at the same electric potential. The other output terminals 12, 14 also at the same potential. Four loads 41, 42, 43, 44 are connected to the five output terminals 11, 12, 13, 14, 15.

The current supply arrangement further includes three transformers 70. The primary coils of the transformers 70 are connected in a Delta configuration and are connected via taps 71, 72 to the three outer conductors of the three-phase power grid. The transformers 70 can be disconnected from the power grid by way of a three-pole switch.

The secondary coils of the transformers 70 have taps 73, 74, 75, 76, 77, 58. These taps 73 to 78 are connected with input terminals 21 of second current supply devices 20. The input terminals 21 of a second current supply device 20 are connected with the secondary-side taps 73 to 78 of exactly one transformer 70. However, several second current supply devices 20 can be connected to a single transformer 70. As shown in the example, two second current supply devices 20 are connected to each transformer 70. Each second current supply device 20 has an output terminal 24.

The current supply arrangement has several terminal groups. A respective terminal group is associated with each second current supply device 20, and vice versa. A first terminal 31 and a second terminal 35 are provided in each terminal group. The first terminal 31 of each terminal group is connected with the output terminal 24 of the associated second current supply device 20. The second terminal 35 of each terminal group is connected with a secondary-side tab 79 of the transformer 70 to which the second current supply device 20 associated with the terminal group is connected.

All terminals 31 to 35 of terminal groups, i.e., including the first terminal 31 and the second terminal 35, can be connected with the output terminals 11 to 15 of the first current supply device 10 by way of switching means 51 to 55 of the first switching means groups, or can be disconnected from the output terminals 11 to 15 by way of these switching means 51 to 55. A first switching means group is associated with each terminal group, and vice versa. This switching means 51 to 55 are controllable switching means. The switching means 51 to 55 of the first switching means groups are controlled by a central controller 56. The controller is configured such that always only the switching means 51 to 55 of a single switching means group can be closed. Accordingly, the terminals 31 to 35 of only one terminal group can be simultaneously connected with a first current supply device 10 by way of the associated switching means 51 to 55. Alternatively, none of the first switching means 51 to 55 may be closed, so that none of the terminals 31 to 35 of one of the terminal groups are connected with the first currently supply device 10.

The current supply arrangement may include second switching means groups, of which one second switching means group is associated with a terminal group in one-to-one correspondence. The first terminal 31 and the second terminal 35 of each terminal group can be connected with a reference potential by way of switching means of one of the second switching means groups. In a preferred embodiment, this occurs only when the terminals 31 to 35 of a terminal group are connected with the first current supply device 10 by way of the switching means 51 to 55.

A method for operating this current supply device or a similar current supply device will now be briefly described. According to the method, the terminal group is sequentially connected first to the first power device terminals 10 by connecting to the output terminals 11, 12, 13, 14, 15 of the first power device 10 of the terminals 31, 32, 33, 34, 35 of the terminal group that had just been connected to the first power device 10 by way of the switching means 5, 52, 53, 54, 55 of a first switching means group. If the terminals 31, 32, 33, 34, 35 of a terminal group are not connected with the first current supply device 10, then the switching means 51, 52, 53, 54, 55 of the first switching means group associated with the terminal group are open. After the terminals 31, 32, 33, 34, 35 of a terminal group are connected for a predetermined time, preferably until the thin silicon rod pairs connected as loads 41, 42, 43, 44, 45 have ignited, the switching means 51, 52, 53, 54, 55 are opened. Thereafter, current is supplied from the second current supply device 20 associated with the terminal group.

The invention claimed is:

1. A current supply arrangement for a reactor for producing polysilicon, the arrangement comprises
a first current supply device (10),
a second power supply device (20) including at least two AC current regulators (22) and a voltage sequence controller (23) for controlling the AC current regulators (22),
a terminal group
including at least two terminals (31, 32, 33, 34, 35) for connecting at least one load (41, 42, 43, 44), wherein a first terminal (31) is connected directly without an interconnected switch, with an output terminal (24) of the second current supply device (20), and
including a first switching group associated with the terminal group, with switches for connecting and disconnecting the terminals (31, 32, 33, 34, 35) of the terminal group with or from output terminals (11, 12, 13, 14, 15) of the first current supply device (10),
wherein the current supply arrangement comprises additional second current supply devices (20) including at least two AC current regulators (22) and a voltage sequence controller (23) for controlling the AC current regulators (22),
additional terminal groups comprising at least two terminals (31, 32, 33, 34, 35) for connecting at least one load (41, 42, 43, 44), wherein the terminals (31, 32, 33, 34, 35) of each terminal group a first terminal (31) is connected directly, without an interconnected switch, with an output terminal (24) of one of the additional second current supply devices (20), and
additional first switching groups, each associated with a corresponding one of the additional terminal groups, with first switches (51, 52, 53, 54, 55) for connecting and disconnecting the terminals (31, 32, 33, 34, 35) of the terminal group with or from the output terminals (11, 12, 13, 14, 15) of the first current supply device (10).

2. The current supply arrangement according to claim 1, wherein each terminal (31, 32, 33, 34, 35) of a terminal group is connectable with exactly one of the output terminals (11, 12, 13, 14, 15) of the first current supply device (10) by way of the switches (51, 52, 53, 54, 55) of the associated switching group.

3. The current supply arrangement according to claim 2, wherein each terminal group comprises a second terminal (35).

4. The current supply arrangement according to claim 3, wherein the first terminal (31) and the second terminal (35) of each terminal group are connectable to a reference potential by way of switches (61, 65) of a second switching group.

5. The current supply arrangement according to claim 3, wherein each terminal group has a number of 2*n+1 terminals, wherein n is a natural number.

6. The current supply arrangement according to claim 5, wherein the 2*n+1 terminals, a first subgroup of n+1 terminals, including the first terminal (31) and the second terminal (35), are connectable to the reference potential by way of the switches of the second switching group.

7. The current supply arrangement according to claim 3, wherein the current supply arrangement comprises at least one transformer (70) having a plurality of secondary-side taps (73, 74, 75, 76, 77, 78, 79), wherein an outer tap (79) of the secondary-side taps (73, 74, 75, 76, 77, 78, 79) is connected with the second terminal (35) of at least one terminal group, while the remaining secondary-side taps (73, 74, 75, 76, 77, 78) are connected with input terminals of the second current supply devices (20).

8. The current supply arrangement according to claim 1, wherein the first current supply device has a number of 2*m+1 output terminals (11, 12, 13, 14, 15), wherein m is a natural number.

9. The current supply arrangement according to claim 8, wherein a first output terminal (11) and a second output terminal (15) are connectable with the first terminals (31) and the second terminal (35) of the terminal groups by way of the switches of the first switching group.

10. The current supply arrangement according to claim 9, wherein the first output terminal (11) and the second output terminal (15) are at the first potential during operation of the first current supply device.

11. The current supply arrangement according to claim 8, wherein, of the 2*m+1 output terminals, a first subgroup of p+1 output terminals, including the first output terminal (11) and the second output terminal (15), are at a first potential or at the first potential during operation of the first current supply device, wherein p is a natural number.

12. The current supply arrangement according to claim 11, wherein, of the 2*m+1 output terminals, a second subgroup of p output terminals is at a second potential.

13. The current supply arrangement according to claim 12, wherein the nominal voltage of the second current supply devices (20) that is being provided at the output terminals of the second current supply devices (20) is at least m-times the nominal voltage of the first current supply device (10) that is being provided between the output terminals of the first subgroup and the output terminals of the second subgroup of the first current supply device (10).

14. A method for supplying loads (41, 42, 43, 44, 45) connectable to terminals (31, 32, 33, 34, 35) of terminal groups of a current supply arrangement according to claim 1, wherein the terminals (31, 32, 33, 34, 35) of the terminal groups are sequentially connected with the output terminals (11, 12, 13, 14, 15) of a first current supply device (10) by way of the switches (51, 52, 53, 54, 55) of the switching group associated with the terminal group, while the terminals (31,

32, 33, 34, 35) of the remaining terminal groups are disconnected from the output terminals (11, 12, 13, 14, 15) of a first current supply device (10).

15. The method according to claim 14, wherein, after the terminals (31, 32, 33, 34, 35) of a terminal groups are connected by way of the switches (51, 52, 53, 54, 55) of the switching group associated with the terminal group, these terminals (31, 32, 33, 34, 35) are supplied with current from a second current supply device (20) associated with the terminal group.

* * * * *